Oct. 7, 1958 P. W. JOHNSON 2,854,754
ROLL GAGE WITH TEST PART CARRIER
Filed March 13, 1956
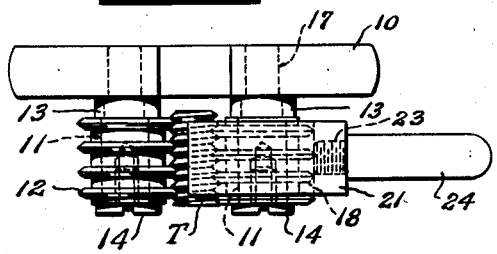
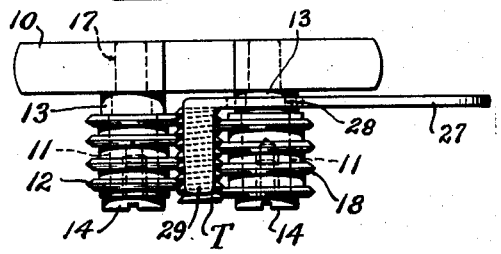
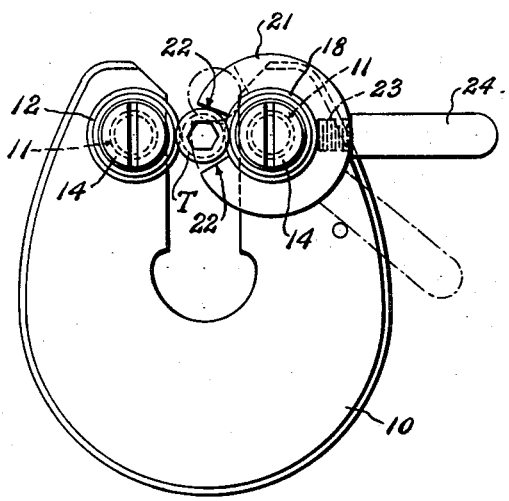
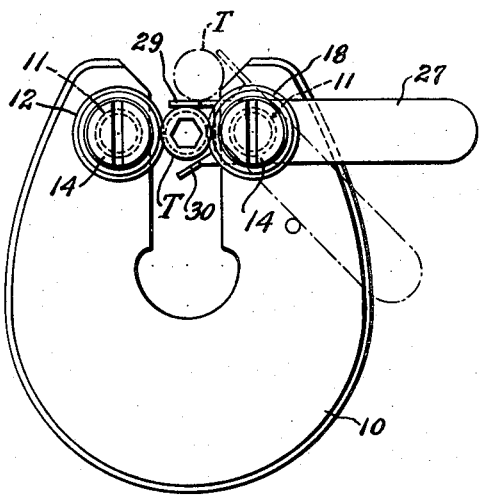
INVENTOR.
PAUL W. JOHNSON
BY
ATTORNEYS

United States Patent Office 2,854,754
Patented Oct. 7, 1958

2,854,754
ROLL GAGE WITH TEST PART CARRIER

Paul W. Johnson, Bloomfield, Conn., assignor to The Johnson Gage Development Company, Bloomfield, Conn., a corporation of Connecticut Application March 13, 1956, Serial No. 571,193

5 Claims. (Cl. 33—143)

The invention relates to a gage of the roll type having a carrier for the test part to aid in passing the test part to gaging position or passing the test part through the gage rolls as in a snap type of gage. With small sized parts, such as screws, and particularly parts without an extension such as the head on a screw, it is difficult to insert the test part between the gaging rolls. A carrier is provided to insert the test part into gaging position between the rolls or through the rolls.

It is an object of the invention to construct a simple and inexpensive carrier for inserting a test part into or through the rolls of a gage.

Other objects of the invention will be more apparent from the following description when taken in connection with the accompanying drawings illustrating two preferred embodiments thereof in which:

Figure 1 is a top view of a thread roll gage of the snap type with the carrier and with a test part being projected between the gaging rolls;

Figure 2 is a side view of the gage with the carrier of Figure 1 with a test part passing between the gaging rolls;

Figure 3 is a top view of a thread roll gage of the snap type having another form of carrier for projecting the test part between the gaging rolls; and Figure 4 is a side view of the gage and carrier of Figure 3 with a test part being passed through the rolls.

The gage with a test part carrier is shown particularly applied to a thread gage of the snap type. The carrier, however, is also suitable for plain surfaced parts. The carrier is also suitable to be used with the comparator type of gage in which one roll is fixed in position and the cooperating roll is mounted for movement towards and from the other and the diameter of the test part is indicated by an indicator as shown in the Johnson Patent Number 2,730,808. The carrier is mounted as shown herein with respect to the fixed gaging roll.

The gage includes a frame 10 of any suitable construction. The frame carries a stud 11 on which is rotatably mounted a gage roll 12. The roll particularly illustrated is a ribbed roll for gaging a screw thread. A spacing washer 13 may be used between the gaging roll and the frame if desired. A headed screw 14 may be received in the end of the stud to retain the gaging roll on the stud.

A cooperating gaging roll is mounted adjacent to the gaging roll 12. In the snap type of gage particularly illustrated, a cooperating gaging roll is carried on a stud 17 mounted on the frame. A cooperating gaging roll 18 is rotatably mounted on the stud. A spacing washer 13 also may be used, if desired. A headed screw 14 retains this gaging roll on the stud. Any suitable form of stud may be used for mounting each gaging roll.

The test part carrier is mounted so that it pivots on an axis corresponding with the axis of the stud. In the construction of Figures 1 and 2 the carrier 21 is a collar or ring having a central hole therethrough to pass over the gaging roll 18. The carrier has a slot 22 therein extending to the central hole which slot is wide enough or the surfaces or faces forming the slot are spaced apart to receive a test part such as a screw T. Preferably, the faces or sides of the slot are inclined or radial. The carrier is retained on the gaging roll 18 by a screw 23 which may carry a handle 24. The screw 23 clamps the carrier on the gaging roll. Although this gaging roll is free to pivot or rotate on its stud such pivoting is limited in normal use by the carrier. By unloosening the screw 23 the position of the carrier may be adjusted circumferentially to bring another point on the circumference of the gaging roll 18 within the groove 22 so that the roll does not wear excessively or at any one part of its periphery. The carrier, in being mounted on the gaging rolls, pivots or turns on the axis of the gaging roll and stud. The collar has a dimension at least at the slot so that it may pass between the gaging rolls.

In operation the carrier is pivoted upwardly by the handle 24 to the position shown in dot-dash lines. The test part is inserted in the slot whereupon the carrier and the gaging roll 18 pivots carrying the screw to gaging position between the two gaging rolls 12 and 14 corresponding with a plane passing through the axes of the two studs or passes the test part through gaging position. If the test part passes between the rolls as in a snap type gage, it is known that the test part is not too large and if its fails to pass therethrough, the test part is too large. Usually the gage also includes a pair of so-called not-go rolls between which the test part is passed in order to assure that the test part is not too small.

The construction of Figures 3 and 4 shows a carrier which is mounted so that it pivots on the axis corresponding with the axis of the stud. This carrier, however, has a hole or bearing mounting the same for pivotal movement on the stud or the spacing washer 13. The carrier includes a lever 27 having a hole or bearing 28 therein so that it may pivot on the spacing washer 13 or may be suitably fastened to the latter so that it pivots on the stud. The carrier may be secured to the spacing washer such as by a drive fit thereon. The carrier, therefore, pivots on an axis corresponding to that of the stud. The lever carries spaced fingers 29 and 30 which project laterally and pivot between the gaging rolls and provide a slot therebetween or spaced faces or surfaces for receiving the test part T. The finger 30 is shown at an angle although this is not essential but makes it simpler to insert a test part into the slot formed by the fingers. In this construction, each gaging roll, including the roll carried by the same stud that mounts the carrier, is free to rotate on its stud. The fingers have a dimension so that they pass between the gaging rolls.

In using the gage of Figures 3 and 4, the lever is pivoted downwardly to bring the fingers of the test part carrier above the gaging rolls so that the test part may be inserted in the slot between the fingers. The lever then is turned upwardly which brings fingers and the test part into gaging position between the rolls, and for a snap type of gage, projects it therethrough. This gage, too, may have not-go rolls to test whether or not the test part is too small.

The invention is presented to fill a need for improvements in a roll gage with test part carrier. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A gage comprising a frame; gaging mechanism carried by the frame including a pair of spaced gaging roll means having a gaging periphery to gage a test part therebetween, and a pair of spaced stud means mounted on the frame and each stud rotatably mounting one of said gaging roll means; each stud means having an axis; and a test part carrier mounted on one of said means and rotatable on an axis corresponding to that of the stud means and having a pair of surfaces spaced apart a distance to freely receive the test part therebetween and having a dimension to pass between the peripheries of the spaced gaging roll means, and a handle secured to the carrier and extending outwardly therefrom to pivot the carrier.

2. A gage as in claim 1 in which the carrier has a bearing receiving one of said stud means for pivoting thereon.

3. A gage as in claim 1 in which the carrier has a bearing receiving one of said stud means at one end of one of said gaging roll means carried by the stud means, and a pair of spaced fingers extending laterally providing the spaced surfaces, the fingers extending adjacent the periphery of the roll means.

4. A test part carrier for a gage having spaced gaging rolls comprising a collar having a hole therethrough to receive a gaging roll; a slot through the collar having surfaces spaced to receive a test part therebetween, means carried by the collar to secure the same to a gaging roll, and a handle secured to the collar and extending outwardly therefrom.

5. A gage comprising a frame, a pair of spaced studs mounted on the frame, a pair of spaced gaging rolls each rotatably mounted on one of said studs and having a gaging periphery to gage a test part therebetween, and a test part carrier mounted on one of said gaging rolls and pivoted with said gaging roll including a collar having a bore to receive the gaging surface of the gage roll, the collar having a slot from the periphery through to the bore providing a pair of surfaces spaced apart a distance to freely receive the test part therebetween and having a dimension to pass between the peripheries of the spaced gaging rolls, and means securing the collar to the gaging roll.

References Cited in the file of this patent

UNITED STATES PATENTS

| 611,564 | Crump | Sept. 27, 1898 |
| 622,475 | Hubbell | Apr. 4, 1899 |
| 2,387,218 | Troedson | Oct. 16, 1945 |

FOREIGN PATENTS

| 920,124 | Germany | Nov. 15, 1954 |